S. W. Tyler,
Mower.
No. 1016. Reissued Nov. 13. 1860.
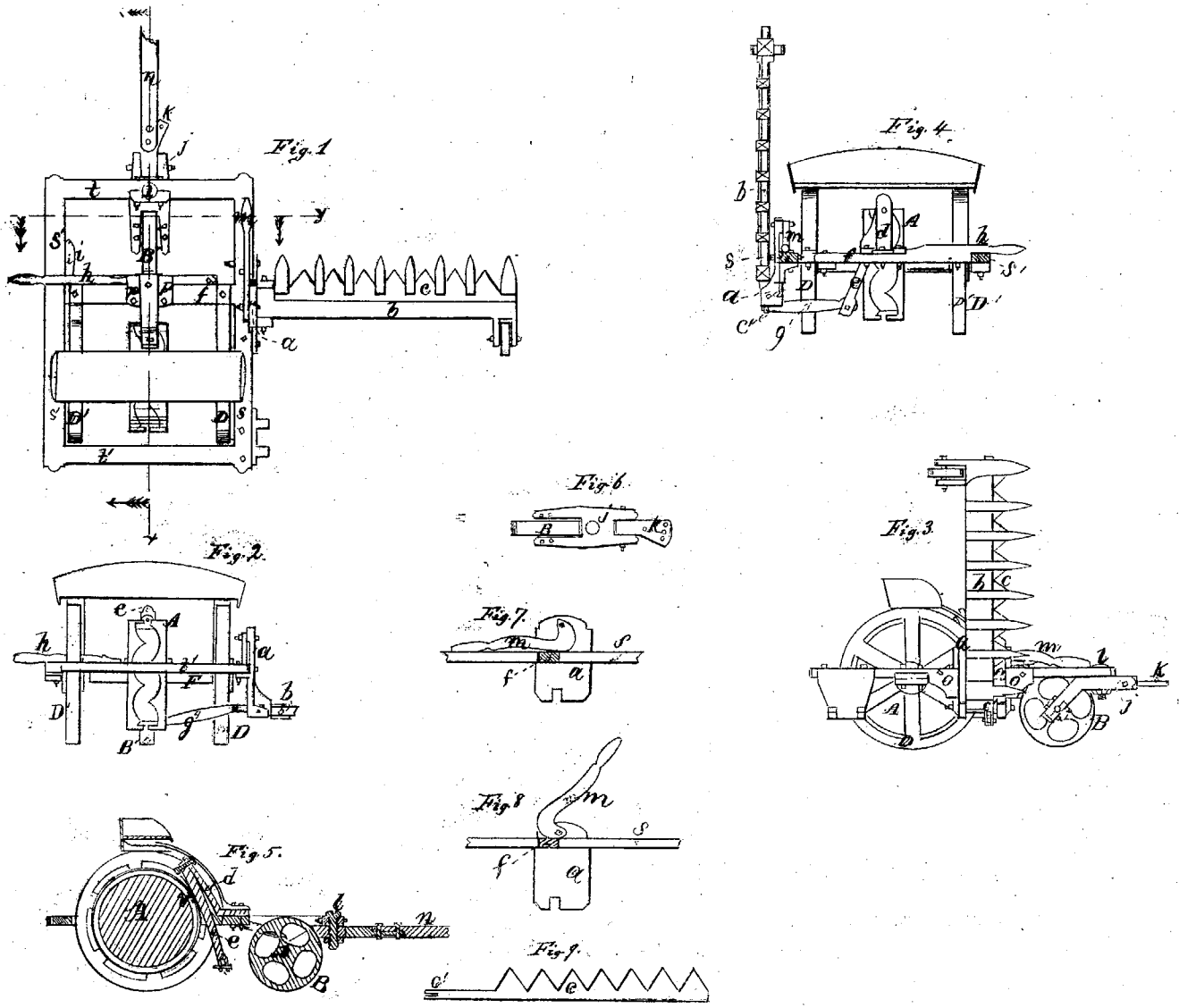

UNITED STATES PATENT OFFICE.

SAMUEL W. TYLER, OF GREENWICH, NEW YORK.

IMPROVEMENT IN HARVESTERS.

Specification forming part of Letters Patent No. 19,218, dated January 26, 1858; Reissue No. 1,076, dated November 13, 1860.

*To all whom it may concern:*

Be it known that I, SAMUEL W. TYLER, of Greenwich, Washington county, and State of New York, have invented certain new and useful improvements in harvesting-machines adapted to harvesting all kinds of small grain and grasses; and I do hereby declare that the following is a full and exact description thereof, reference being had to the accompanying drawings, with the letters of reference thereon, constituting a part of this specification.

Figure 1 represents a top or plan view of a machine containing my improvements. Fig. 2 is a view of the rear elevation of such a machine. Fig. 3 is a view of a side elevation. Fig. 4 is a view of a vertical section thereof in the line *y y* of Fig. 1, and Fig. 5 is a sectional view of it in the line *x x* of Fig. 1. Figs. 6, 7, 8, and 9 represent views of detached portions thereof.

In view of the fact that all harvesting-machines with which I am acquainted have been of such a complicated nature, and in their construction necessarily of such great weight as to render them not only unwieldy and of great burden to a team, and very liable to get out of order, but also so very expensive as to place them quite beyond the reach of many of our smaller farmers, it has been the particular object of this invention to so far avoid complexity, and at the same time combine all of the essential principles necessary to the convenient and successful working of harvesting-machines with such new-formed devices, as will insure to a machine an uncommon degree of lightness, convenience, durability, and the successful working of the same combined, and at the same time to so far lessen the expense thereof as to place it within the reach of all to whom a machine of this character would be of value. The particularly-desirable features which are embraced in this combination, and by means of which new and very important results are effected, which render it greatly superior to any previous invention with which I am acquainted, are, first, the independent and substantially-upright carriage of the machine, which is not subject to tilt or turn over, combined with a vertically automatic head-piece, which forms such an attachment for the reciprocal cutting apparatus to the carriage of the machine as will allow each independently of the other to adjust itself to the inequalities of the ground; second, such an arrangement of the actuating-gear in relation to the head-piece as will avoid all weight of the same upon the cutting apparatus, securing to the cutting apparatus an independently free and light movement upon the ground, and thereby relieving the team of much weight, both direct and sidewise, which would be occasioned by the dragging weight of said gear upon or in conjunction with the cutting apparatus, also nearly equalizing the weight of the inner end of the cutting apparatus with that of its outer end, which is a very great desideratum, in view of a perfect adaptation of the cutting apparatus to the inequalities of the ground; third, such an arrangement of the cutting apparatus in relation to the driving or actuating portions of the machine that it may perform its work, by the use of the reciprocating cutters, at the side of the machine, allowing the upright or main parts of the machine to travel only upon the stubble, thereby avoiding the tramping down of the standing grass by the team or by the wheels of the machine, thus forming, as a whole, a new combination of novel capacity and very great utility, which it is believed has never before been used or invented, and which has been effected by means of a very few uncommonly simple devices after many careful experiments and great expense.

My invention therefore consists in so combining all of the above-described features as to secure the results of their combined operation, substantially as herein described, and for the purpose set forth in this preface.

To enable others skilled in the art to make and use my invention, I proceed to state its manner of construction and principle of operation.

My improvements are shown in this instance in a machine having a rectangular frame with side pieces, S S′, and the cross-pieces *t t*, firmly fastened to or framed into each other and the transverse beam *f*. The frame rests mainly upon the wheels D D′, while the front end is supported upon the pilot-wheel B. The wheels D D′ are placed on the axle F, and the pilot-wheel B is made to revolve on a short axle through the hounds *j*, which are connected to the front end of the frame. The finger-bar *b* is jointed to the automatically vertically adjustable head-piece *a*, which works within suitable guiding-brackets, *e e*, which are secured to the side piece S of the frame. The cam-lever *m*, which is jointed to the said piece *a*, bears against the side piece S of the frame, and is used by the hand of the operator to elevate the cutting apparatus; and if the handle of the lever is carried forward and down to the side piece S it will rest upon a flat side, which flat side will then be brought perpendicularly under the point of its joint to the head-piece, and the cutting apparatus and pitman-rod will thus be raised permanently to a height corresponding to the length of the cam, and beyond the reach of obstacles in its path while traveling. An actuating-wheel, A, is fastened to the center of the axle F, and has a zigzag groove on its periphery, which enables it to impart motion to the cutters by means of the pendulous lever *e* and the pitman *g*, as represented in Fig. 5. The pendulous lever *e* is jointed to the standard *d*, which rises from its connection with the transverse beam *f* of the frame. The foot of the standard *d* fits into a groove whose sides are formed by the cheeks *p p*, which are bolted to the beam *f*, and the foot of the standard *d* is also jointed to the horizontal lever *h*, which is placed immediately in front of the cross-beam *f*, and is jointed to a projection from said beam, as represented in Fig. 1. A pivot projecting from the pendulous lever *e* carries a roller, *v*, which fits into the zigzag groove in the actuating-wheel A, and thereby receives the motion which actuates the cutters. By pressing the lever *h* forward the standard *d* is moved with it, and the pendulous lever *e* will be thrown out of gear with the actuating-wheel A at the will of the operator. After having raised the finger-bar in the manner before stated, the same may be folded up perpendicularly to the frame of the machine for convenient transportation or storage.

The adjustment of the tongue and hounds *j* in relation to each other and to other portions of the machine, not forming any part of the invention claimed herein, any description of them is omitted.

It is obvious that an ordinary combination of cog-gearing may be used in place of the grooved wheel A as an actuating medium to the cutters without changing the nature of this combination or invention.

I am aware that combinations for harvesting-machines have been invented in which the principles involved in the use of an adjustable head-piece have been to some extent developed prior to the date of my invention, although in no such manner as to effect the functions which are performed by my devices when employed in the particular combination herein described; and in view of the fact that the date of such invention in one instance extends back as far as 1823, I am aware also that no subsequent invention can be entitled to a patent for a device embodying like principles, except as being used in an improved combination, resulting in the accomplishment of new and useful objects. Therefore I do not claim the use of the vertically-adjustable head-piece as new when considered apart from other combined portions of the machine, nor do I claim it as being combined with any particular kind of frame; but,

Having thus fully described the nature of my invention, what I claim therein as new, and desire to secure by Letters Patent, is—

The single head-piece *a*, or its equivalent, as an intermediate automatically-adjusting attachment for the reciprocating cutting apparatus to the carriage of harvesting-machines, when combined with two or more main driving or bearing wheels and with the actuating-gear in such a manner as to permit of the cutting apparatus being attached at the side of the carriage of the machine and allow it to adjust itself to the inequalities of the ground independently of the actuating-gear and other main portions of the machine, for the purposes and in the manner substantially as described.

S. W. TYLER.

Witnesses:
O. S. X. PECK,
AUGUSTUS POHLERS.